US008702156B1

(12) United States Patent
Chung

(10) Patent No.: US 8,702,156 B1
(45) Date of Patent: Apr. 22, 2014

(54) CONNECTING STRUCTURE FOR FENDER APRON

(71) Applicants: Hyundai Motor Company, Seoul (KR); Kia Motors Corporation, Seoul (KR)

(72) Inventor: Hee Seouk Chung, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/707,474

(22) Filed: Dec. 6, 2012

(30) Foreign Application Priority Data

Oct. 9, 2012 (KR) ........................ 10-2012-0112023

(51) Int. Cl.
*B60N 99/00* (2006.01)
(52) U.S. Cl.
USPC .................................................... 296/193.05
(58) Field of Classification Search
USPC .............. 296/193.05, 193.06, 203.02, 203.03
See application file for complete search history.

(56) References Cited

U.S. PATENT DOCUMENTS

| 7,988,227 B2 | 8/2011 | Kanada et al. | |
| 2002/0063444 A1* | 5/2002 | Kim | 296/203.02 |
| 2004/0207234 A1* | 10/2004 | Kim | 296/203.03 |

FOREIGN PATENT DOCUMENTS

| JP | 2009-196429 A | 9/2009 |
| KR | 95-14106 U | 6/1995 |
| KR | 10-2008-0052754 A | 6/2008 |
| KR | 20-0235186 U | 6/2011 |

* cited by examiner

*Primary Examiner* — Lori Lyjak
(74) *Attorney, Agent, or Firm* — Morgan, Lewis & Bockius LLP

(57) ABSTRACT

A connecting structure for a fender apron may include a fender apron; a cowl side member that has the same cross-sectional shape as a part of the fender apron and is coupled with the fender apron; and an A-pillar of which the inside is coupled with the cowl side member.

9 Claims, 6 Drawing Sheets

CONNECTING STRUCTURE FOR FENDER APRON

CROSS-REFERENCE TO RELATED APPLICATION

The present application claims priority to Korean Patent Application No. 10-2012-0112023 filed on Oct. 9, 2012, the entire contents of which is incorporated herein for all purposes by this reference.

BACKGROUND OF THE INVENTION

1. Field of the Invention

The present invention relates to a connecting structure of a fender apron, and more particularly, to a connecting structure for a fender apron that can disperse an impact load when a vehicle collides.

2. Description of Related Art

When a vehicle collides head-on, a front side member of the vehicle serves to absorb an impact.

However, according to an investigation, accidents in which the vehicle collides off the front side member occupy 25% of actual accidents in a collision accident.

In the accidents in which the vehicle collides off the front side member, a fender apron serves to transfer an impact load.

A general collision load transferring component is constituted by three units of an under body unit, for example, a front apron member, a side body unit, for example, an A-pillar upper reinforcement unit and a door hinge reinforcement unit, and a cowl unit, for example, a cowl side member.

However, in the case of coupling of the respective units, respective connection sections are not continuous, and thus coupling force is weak, and the respective units are connected to each other by a flange, and as a result, a process for connection needs to be added and a deformation possibility by impact load transferring is high.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a connecting structure for a fender apron having advantages of dispersing an impact load when a vehicle collides.

An exemplary embodiment of the present invention provides a connecting structure for a fender apron, including, a cowl side member that may have the same cross-sectional shape as a part of the fender apron and is coupled with the fender apron. An A-pillar of which the inside is coupled with the cowl side member.

The fender apron may have a rectangular closed section on a cross section thereof, and the cowl side member may have a cross-sectional shape of a "U" shape.

The cowl side member may include a front part coupled with the fender apron. A rear part inserted into the A-pillar.

A bulk head may be provided between the front part and the rear part of the cowl side member.

A coupling groove may be formed between the front part and the rear part, and the bulk head may be seated on the coupling groove.

The A-pillar may include an A-pillar upper reinforcement member. A side outer panel, and the A-pillar upper reinforcement member may be coupled with the bulk head through the coupling groove.

A coupling groove may be formed between the front part and the rear part, and the bulk head may be seated on the coupling groove.

The A-pillar may include an A-pillar upper reinforcement member. A side outer panel, and the A-pillar upper reinforcement member may be coupled with the bulk head through the coupling groove.

The A-pillar may include a side outer panel, an A-pillar upper reinforcement member for reinforcing rigidity of the side outer panel, and the A-pillar upper reinforcement member may be coupled to the bulk head.

The A-pillar upper reinforcement member and the cowl side member may be coupled with each other to form the closed section.

The A-pillar may include a side outer panel, an A-pillar upper reinforcement member for reinforcing rigidity of the side outer panel, and a part of the cowl side member may be inserted between the side outer panel and the A-pillar upper reinforcement member.

According to an exemplary embodiment of the present invention, in a connecting structure for a fender apron, since sections among respective members for transferring an impact load are continuous, a collision load transferring effect is increased in a collision.

The number of components and a manufacturing process can be simplified by integrating a door hinge reinforcement unit and a cowl side member.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
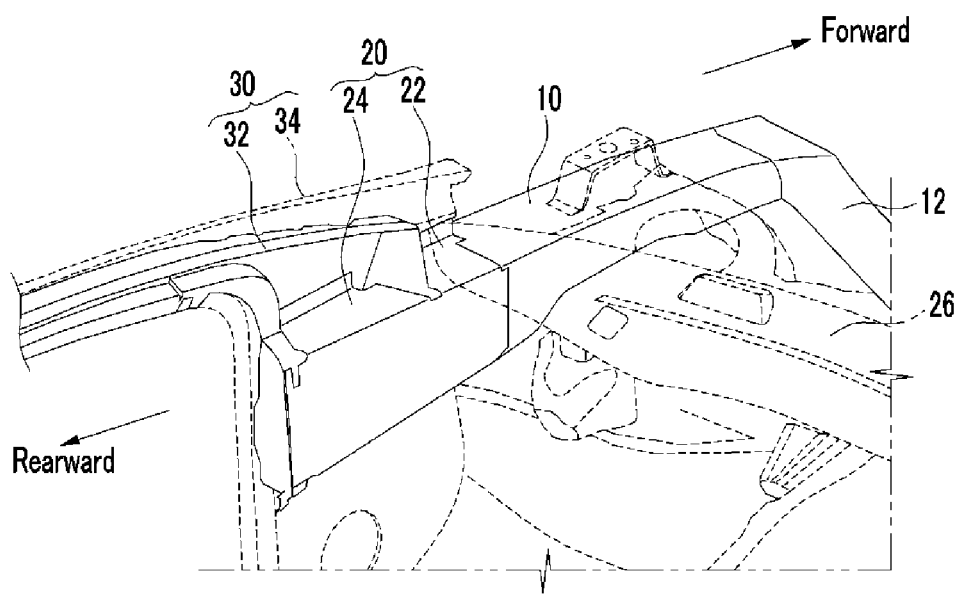
FIG. 1 is a perspective view of a connecting structure for a fender apron according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration.

As those skilled in the art would realize, the described embodiments may be modified in various different ways, all without departing from the spirit or scope of the present invention.

Throughout the specification, like reference numerals refer to like elements.

In the drawings, the thickness of layers, films, panels, regions, etc., are exaggerated for clarity.

It will be understood that when a layer, a film, an area, a plate, and the like are referred to as being "on" another layer or substrate, it can be directly on the other layer or substrate, or intervening them may also be present.

In contrast, when an element is referred to as being "directly on" another element, there are no intervening elements present.

Throughout the specification, unless explicitly described to the contrary, the word "include" and variations such as "includes" or "including", will be understood to imply the inclusion of stated elements but not the exclusion of any other elements.

Hereinafter, an exemplary embodiment of the present invention will be described in detail with reference to the accompanying drawings.

Figure 2:
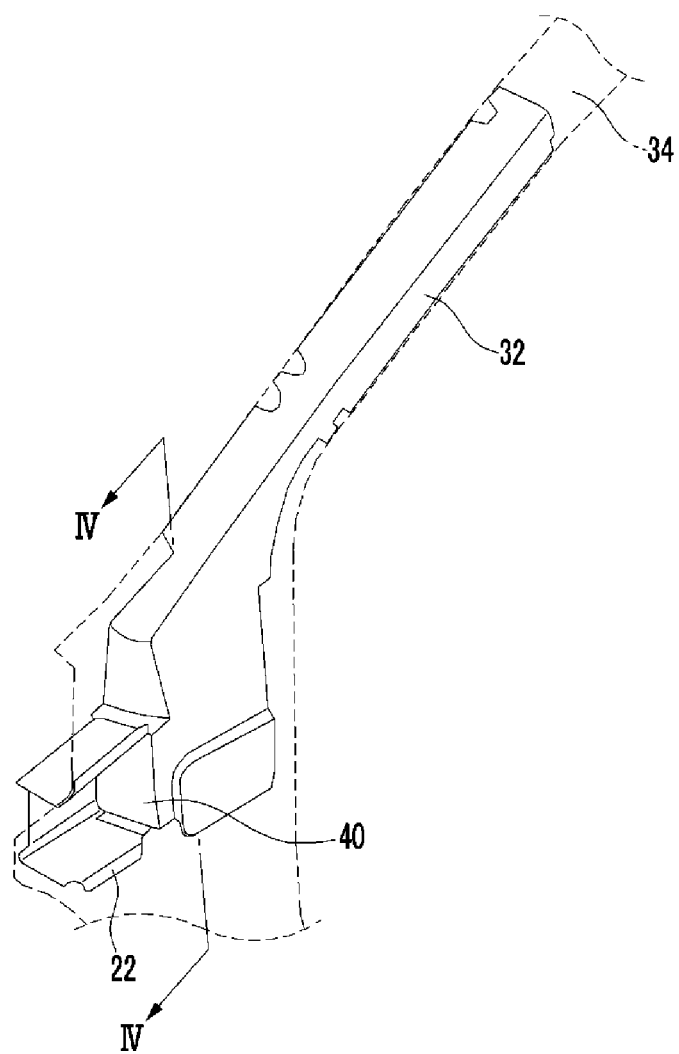
FIGS. 2 and 3 are partial perspective views of the connecting structure for a fender apron according to the exemplary embodiment of the present invention.
Figure 3:
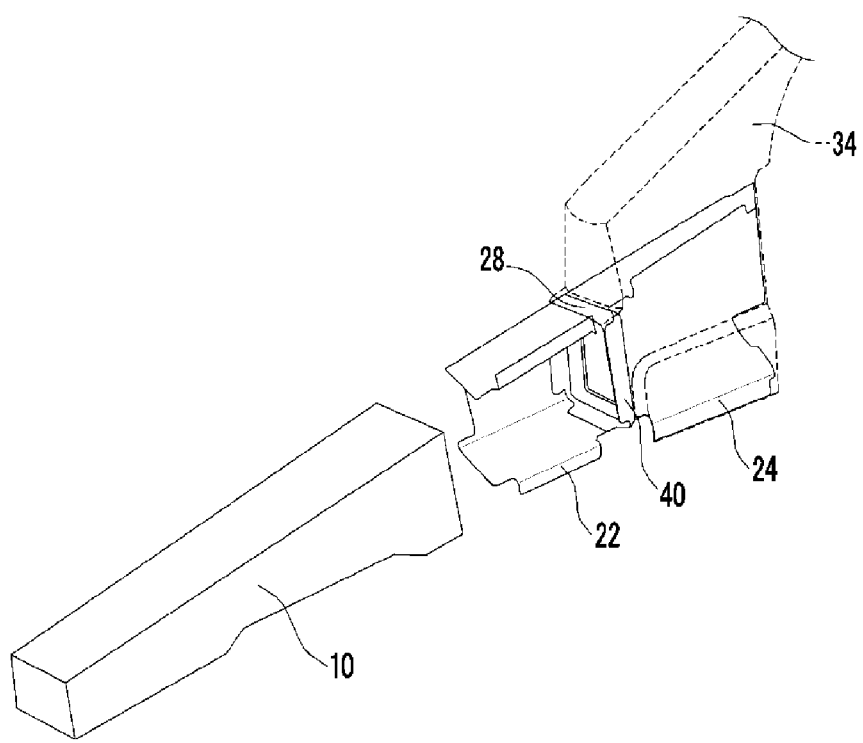
Figure 4:
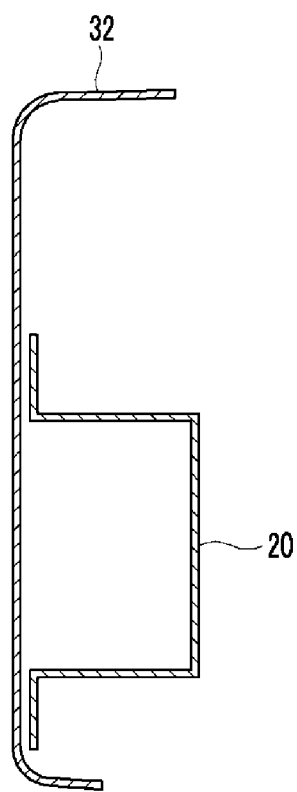
FIG. 4 is a cross-sectional view taken along line IV-IV of FIG. 2.

FIG. 1 is a perspective view of a connecting structure for a fender apron according to an exemplary embodiment of the present invention, FIGS. 2 and 3 are partial perspective views of the connecting structure for a fender apron according to the exemplary embodiment of the present invention, and FIG. 4 is a cross-sectional view taken along line IV-IV of FIG. 2.

Figure 5:
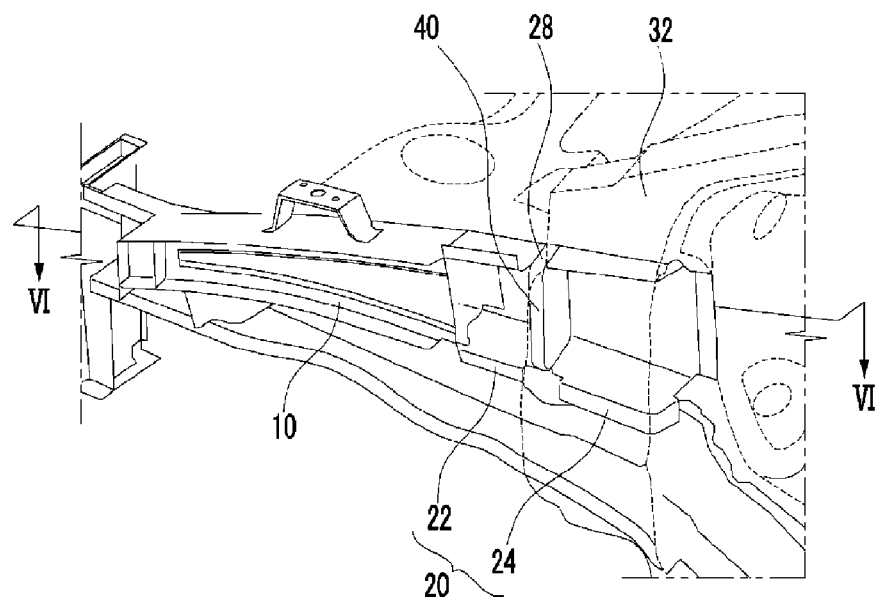
FIG. 5 is a perspective view of the connecting structure for a fender apron according to an exemplary embodiment of the present invention.
Figure 6:
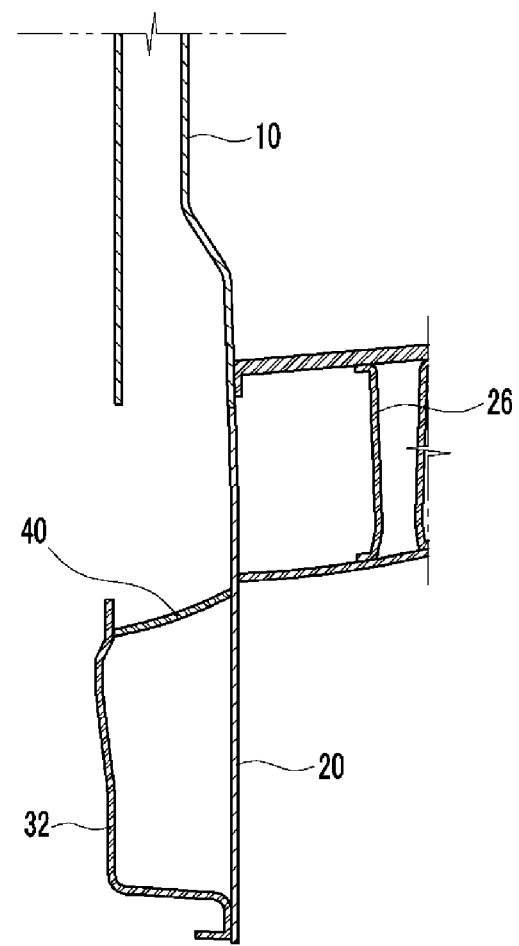
FIG. 6 is a cross-sectional view taken along line VI-VI of FIG. 5.

FIG. 5 is a perspective view of the connecting structure for a fender apron according to an exemplary embodiment of the present invention and FIG. 6 is a cross-sectional view taken along line VI-VI of FIG. 5.

Referring to FIGS. 1 to 6, a connecting structure for a fender apron according to the exemplary embodiment of the present invention includes a fender apron 10, a cowl side member 20 that has the same cross-sectional shape as a part of the fender apron 10 and is coupled with the fender apron 10, and an A-pillar 30 of which the inside is coupled with the cowl side member.

The fender apron 10 is connected with a side member through a connection member 12, and transfers an impact load transferred from a front side to the A-pillar 30 through the cowl side member 20.

The fender apron 10 has a rectangular closed section on a cross section thereof as illustrated in FIG. 3, and the cowl side member 20 may have a cross-sectional shape of a "U" shape and the cowl side member 20 has the same cross-sectional shape as a part of the fender apron 10 in order to smoothly transfer the impact load transferred from the fender apron.

A cowl panel 26 is connected to the cowl side member 20, and the connecting structure for a fender apron according to the exemplary embodiment of the present invention may simplify the number of components and a manufacturing process by integrating a general door hinge reinforcement unit and the cowl side member. That is, the connecting structure for a fender apron according to the exemplary embodiment of the present invention may be configured without the general door hinge reinforcement unit.

The A-pillar 30 includes a side outer panel 34 and an A-pillar upper reinforcement member 32 for reinforcing rigidity of the side outer panel, and the cowl side member 20 is inserted between the A-pillar upper reinforcement member 32 and the side outer panel 34 to increase coupling force and secure rigidity.

The cowl side member 20 includes a front part 22 coupled with the fender apron 10 and a rear part 24 inserted into the A-pillar 30.

As illustrated in FIG. 3, a bulk head 40 may be provided between the front part 22 and the rear part 24 of the cowl side member 20, and the A-pillar upper reinforcement member 32 may be coupled to the bulk head 40.

A coupling groove 28 is formed between the front part 22 and the rear part 24 and the bulk head 40 is seated on the coupling groove 28.

The A-pillar upper reinforcement member 32 is coupled with the bulk head 40 through the coupling groove 28.

The bulk head 40 prevents moisture from being introduced into the inside of the vehicle, reinforces the rigidity of the cowl side member 20, and increases an impact transferring and dispersing effect through coupling with the A-pillar upper reinforcement member 32.

As illustrated in FIG. 4, the A-pillar upper reinforcement member 32 and the cowl side member 20 may be coupled with each other to form the closed section. Therefore, the rigidity of the A-pillar reinforcement member 32 may be increased and the impact load transferred from the cowl side member 20 may be smoothly transferred and dispersed to the A-pillar reinforcement member 32.

As illustrated in FIG. 6, cross-sectional shapes of the fender apron 10, the cowl side member 20, and the A-pillar reinforcement member 32 are continuously formed to increase the impact load transferring and dispersing effect.

As described above, according to the exemplary embodiment of the present invention, in the connecting structure for a fender apron, since the sections among the respective members for transferring the impact load are continuous, a collision load transferring effect is increased in a collision.

Further, the number of components and the manufacturing process can be simplified by integrating the door hinge reinforcement unit and the cowl side member.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A connecting structure for a fender apron, comprising:
   the fender apron;
   a cowl side member that has the same cross-sectional shape as a part of the fender apron and is coupled with the fender apron; and
   an A-pillar of which the inside is coupled with the cowl side member.

2. The connecting structure for the fender apron of claim 1, wherein the fender apron has a rectangular closed section on a cross section thereof, and
   wherein the cowl side member has a cross-sectional shape of a "U" shape.

3. The connecting structure for the fender apron of claim 1, wherein the cowl side member includes:
   a front part coupled with the fender apron; and
   a rear part inserted into the A-pillar.

4. The connecting structure for the fender apron of claim 3, wherein a bulk head is provided between the front part and the rear part of the cowl side member.

5. The connecting structure for the fender apron of claim 4, wherein a coupling groove is formed between the front part and the rear part of the cowl side member, and
   wherein the bulk head is seated on the coupling groove.

6. The connecting structure for the fender apron of claim 5, wherein the A-pillar includes:
   an A-pillar upper reinforcement member; and
   a side outer panel,
   wherein the A-pillar upper reinforcement member is coupled with the bulk head through the coupling groove.

7. The connecting structure for the fender apron of claim 4, wherein the A-pillar includes:
   a side outer panel; and
   an A-pillar upper reinforcement member for reinforcing rigidity of the side outer panel,
   wherein the A-pillar upper reinforcement member is coupled to the bulk head.

8. The connecting structure for the fender apron of claim 6, wherein the A-pillar upper reinforcement member and the cowl side member are coupled with each other to form a closed section.

9. The connecting structure for the fender apron of claim 1, wherein the A-pillar includes
   a side outer panel; and
   an A-pillar upper reinforcement member for reinforcing rigidity of the side outer panel,
   wherein a part of the cowl side member is inserted between the side outer panel and the A-pillar upper reinforcement member.

* * * * *